Dec. 23, 1952 N. E. PARSON 2,622,494
EQUIPMENT TO BE USED IN ROAD CONSTRUCTION
Filed June 9, 1947 2 SHEETS—SHEET 1
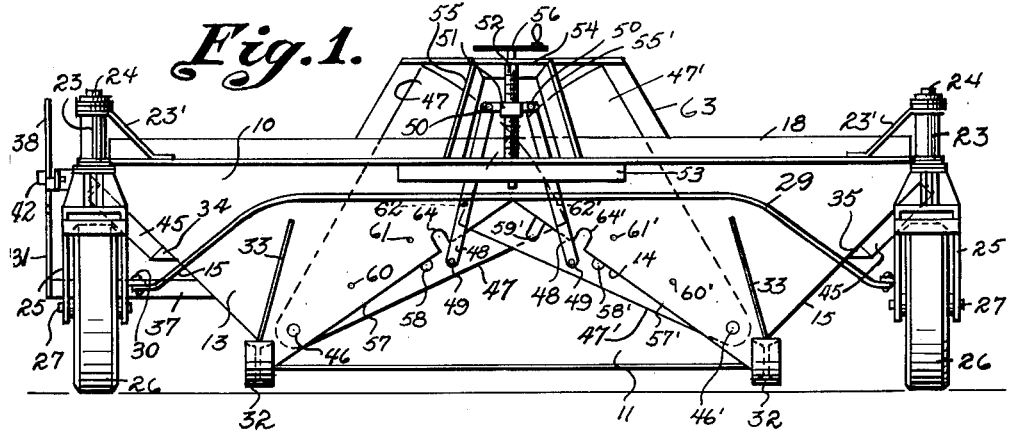
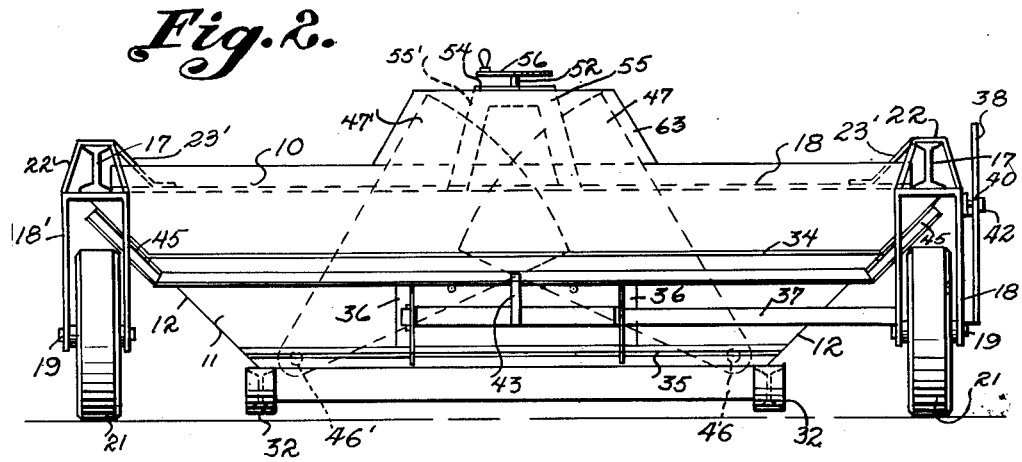
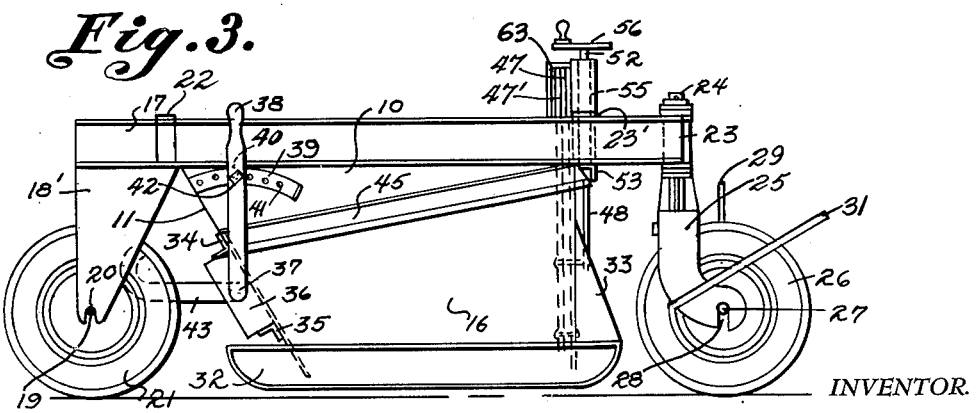
INVENTOR.
Norman Edgar Parson
BY Victor J. Evans & Co.
ATTORNEYS Dec. 23, 1952 N. E. PARSON 2,622,494
EQUIPMENT TO BE USED IN ROAD CONSTRUCTION
Filed June 9, 1947 2 SHEETS—SHEET 2
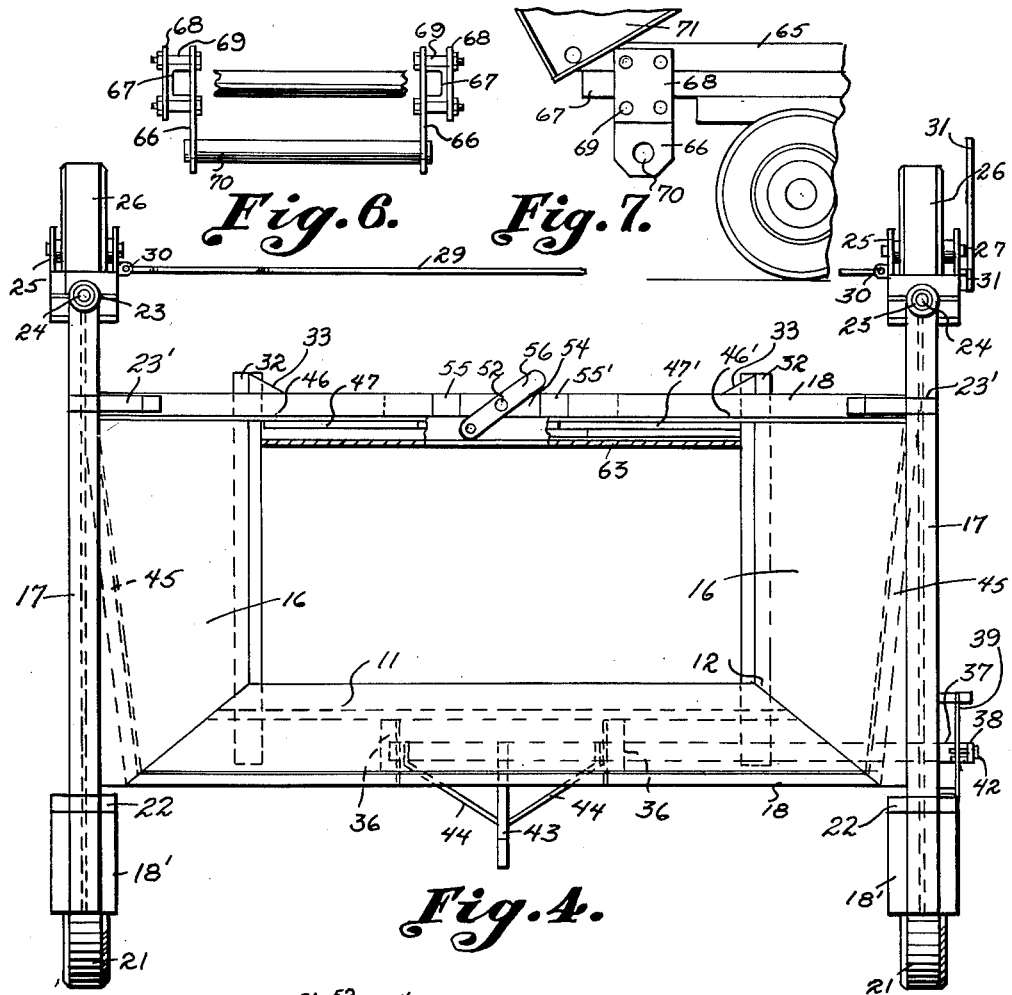
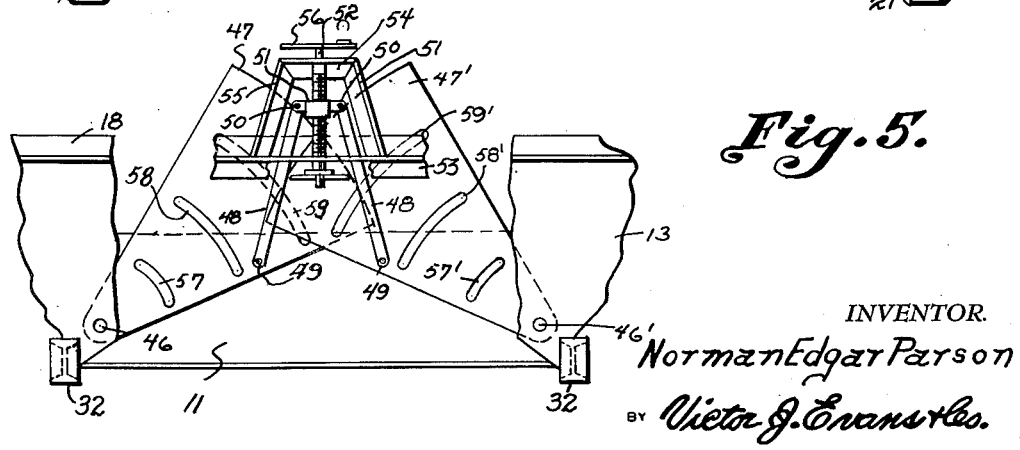
INVENTOR.
Norman Edgar Parson
BY Victor J. Evans & Co.
ATTORNEYS Patented Dec. 23, 1952

2,622,494

UNITED STATES PATENT OFFICE 2,622,494

EQUIPMENT TO BE USED IN ROAD CONSTRUCTION

Norman Edgar Parson, Logan, Utah

Application June 9, 1947, Serial No. 753,529

1 Claim. (Cl. 94—44)

This invention relates to equipment adapted for use in road construction, and more particularly to a material distributor and spreader.

In construction of roads, materials such as gravel, crushed or broken stone, asphalt or the like is spread on the road by a truck in separated piles and the material is spread from the piles by workmen.

It is an object of this invention, therefore, to provide equipment of this character which comprises a hopper body into which the truck discharges the material, mounting the body on wheels and connecting it to the truck so that as the truck moves forward, the material is discharged through the hopper bottom.

Another object of the invention is to provide equipment of this character having pivoted discharge gates thereon which will control the amount of material distributed as the device is towed forward by the truck to which it is connected.

Another object of the invention is to provide equipment of this character which is simple in construction and operation, durable and can be inexpensively manufactured.

With the above and other objects and advantages in view, the invention consists of the novel details of construction, arrangement and combination of parts more fully hereinafter described, claimed and illustrated in the accompanying drawings in which:

Figure 1 is a rear elevational view of an embodiment of the invention;

Figure 2 is a front elevational view thereof;

Figure 3 is an end elevational view thereof;

Figure 4 is a top plan view partly in section;

Figure 5 is a detailed view of the discharge gates or blades with the body broken away to more clearly show the blades;

Figure 6 is an elevational view of the truck hitch with a fragmentary section of a truck shown in conjunction therewith;

Figure 7 is an end view of the truck hitch in position on a truck.

Referring more in detail to the drawings, the reference numeral 10 designates the hopper body having a solid front wall 11 having inclined end edges 12 and a rear wall 13 having an inverted V cut 14 with the apex thereof located at the center of the wall 13. The end edges of the wall 13 are inclined at 15 to conform to the inclination of the end edges of the wall 11, and the side walls 16 are secured by welding or the like to the end edges of the front and rear walls. The hopper 10 has an open bottom and open top, and the hopper is supported by the parallel longitudinal extending side I beams 17 which are secured to the upper longitudinal edges of the side walls 16 and the transverse L-beams 18 which are secured to the upper longitudinal edges of the front and rear walls 11 and 13 respectively.

At the forward end of each of the I beams 17, a fork 18' is secured thereto by welding or the like, and the forks, at their lower ends, each journal an axle 19 by means of the open slot 20 of the wheels 21. A brace 22 is secured to each fork and to the forward ends of the I beams 17 by welding or the like, as shown in Figure 2.

The rear end of each I beam 17 is provided with a bearing 23 in which is journalled the axle 24 of the fork 25 for the caster wheels 26, the axle 27 of which is journalled in the open slots 28 in the fork 25.

A tie rod 29 is connected at its opposite ends at 30 to each caster wheel fork 25, and a lever 31, which may be placed on the left or right caster wheel, is used to steer the caster wheels around a curve, and braces 23' secured to the beam 17 and beams 18 to further strengthen the beams to prevent twisting thereof.

The hopper, at the bottom edge of the side walls, is provided with parallel skids 32 of conventional form, and braces 33 are secured to the rear ends of the skids, and to the rear wall of the hopper 10.

Secured to the front wall 11, transversely thereof, is the upper L-shaped beam 34, and the lower L-shaped beam 35, and parallel L-shaped beams 36 are connected at their opposite ends to the beams 34 and 35 in spaced relation to each other.

The beams 36 journal a shaft 37 therein, which extends outwardly of the hopper at one side thereof to have the lever 38 secured thereto at the outer end thereof.

This lever coacts with the segment 39 secured to one side of the hopper and an opening 40 in the lever when it coincides with one of the openings 41 in the segment, will receive a bolt 42 or the like, to retain the lever in fixed relation to the segment.

The lever controls the rotation of the shaft 37 on which, at the center thereof, intermediate the bars 36, is fixed the tow hook 43, which is adapted to engage the truck to which the hopper is connected for the towing thereof.

Braces 44 connected to the hook 43 and shaft 37 further strengthen the hook 43 to prevent breakage thereof. It will also be noted that L-beams 45 are connected to the side walls with the end welded to the opposite ends of the bar 34, and then inclined upwardly toward the top of the rear wall 13.

Pivoted at 46 and 46' on the rear wall 13 are the distributing gates 47 and 47' respectively, which are shaped to conform to a segment of a circle, and are adapted to overlap each other rearwardly of the wall 13 at the inverted V 14.

Each gate has the lower end of a link 48 connected thereto at 49, while the upper end of the link is connected at 50 to the traveling nut 51 on the screw 52. The screw 52 is journalled at its lower end in the L bar 53 secured to the beam 18, and the upper end journalled in the L-shaped bar 54 which is supported in an elevated position above the bar 53 by the inclined L-shaped bars 55 and 55'. A hand crank 56, on the upper end of the screw 52, controls the rotation of the screw, and the subsequent raising and lowering of the gates on their pivot points 46 and 46'.

The gates underlie the V 14 and curved grooves 57, 58 and 59 in gate 47 engage the indentations 60, 61 and 62 in the rear wall 13 to provide guides and guideways for the gate 47 while grooves 57', 58' and 59' in gate 47' engage the indentations 60', 61' and 62' in the rear wall 13 for the same purpose. The grooves or guideways are equally spaced and contoured to be concentric with the pivot points 46 and 46' respectively.

A housing 63 secured to the rear wall 13 covers the upper ends of the gates 47 and 47' when they are completely moved out of alinement with the V cut 14. Open slots 64 and 64' in the wall 13, at the edges of the cut, permit the pivots 49 to enter so the gates can completely clear the V cut 14.

For connection of the hook 43 to a truck 65, hanger plates 66 are secured to the frame 67 of the truck by the plates 68 and bolts 69, and the hanger plates 66 carry a bar 70 with which the hook 43 engages for the towing of the hopper.

The operation of the equipment is simple. It is connected by the hook 43 to the bar 70 on the truck 65 so that when the body 71 of the truck is elevated into dumping position, the contents thereof will be discharged into the hopper 10. As the contents are being discharged, then the truck moves forward, towing the hopper and depositing the material in a pile of material on the road in the shape of an inverted V. The material is strung out in a line until the truck is completely empty, at which time the truck is disconnected and another truck is connected thereto.

The overall circumference of the pile is determined by the opening and closing of the gates 47 and 47' so that a small pile may be deposited on the road up to and including a pile that will conform in shape to the V-cut 14 in the rear wall 13 of the hopper 10.

The truck proceeds along the road to have the material deposited thereon as desired by the road crew, in the amount needed, and then the material can be placed or distributed on the road as desired.

During some types of road construction it has been found advisable to remove the axles 19 from the slots 20 and the axle 27 from the slots 28 to permit the device to rest and be moved on the skids 32. Thus regardless of the condition of the road or the terrain over which the road is being constructed the device can be moved by either the use of the wheels 21 and 26 or the skids 32.

There has thus been provided a piece of equipment which, it is believed, will accomplish the objects of the invention, and it is believed that the construction and operation thereof will be apparent to those skilled in the art.

It is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A road material spreader comprising a hopper having an open top, an open bottom and solid side, front and rear walls, a frame supporting said hopper, wheels on the front and rear of said frame, skids mounted on the lower side walls in alignment therewith, an inverted V-shaped discharge opening in the rear wall, a pair of overlapping gates pivotally mounted adjacent the lower portion of the opening on the rear wall of said hopper parallel to and abutting said rear wall, each of said gates being shaped in the form of a segment of a circle, said gates adapted to extend over said discharge opening for controlling the size of said opening and manually operated means mounted on said frame and connected to both of said gates for operating the gates simultaneously.

NORMAN EDGAR PARSON.

REFERENCES CITED

The following references are of record in the file of this patent:

UNITED STATES PATENTS

| Number | Name | Date |
|---|---|---|
| 1,034,074 | Cannell | July 30, 1912 |
| 1,401,149 | Foster | Dec. 27, 1921 |
| 1,816,869 | Protzeller | Aug. 4, 1931 |
| 1,939,909 | McCombs | Dec. 19, 1933 |
| 2,054,436 | Mosel | Sept. 15, 1936 |
| 2,055,974 | Greiner | Sept. 29, 1936 |
| 2,195,015 | Schwart | Mar. 26, 1940 |
| 2,403,820 | Miller | July 9, 1946 |